Dec. 21, 1965   R. VOGT   3,224,370
BOOSTER ROCKET
Filed July 27, 1959
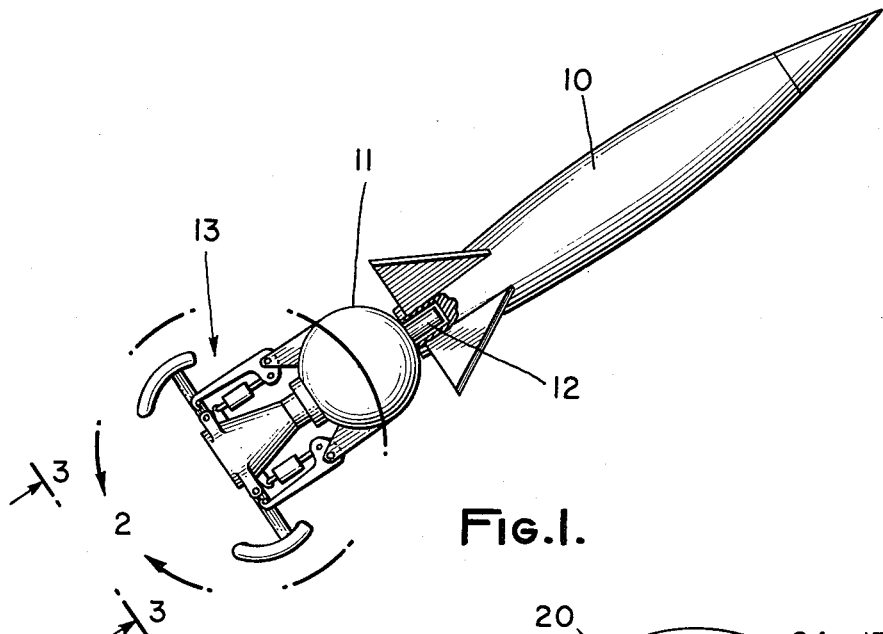
Fig.1.
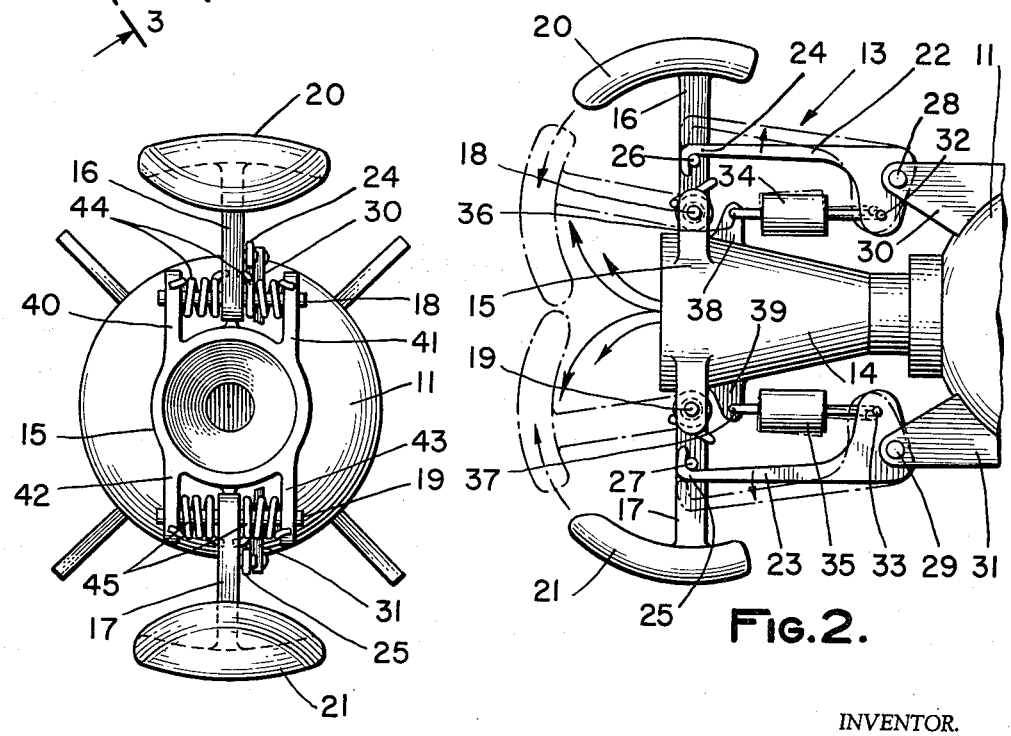
Fig.3.   Fig.2.
INVENTOR.
RICHARD VOGT
BY
ATTORNEYS United States Patent Office 3,224,370
Patented Dec. 21, 1965

3,224,370
BOOSTER ROCKET
Richard Vogt, Santa Barbara, Calif., assignor to Curtiss-Wright Corporation, a corporation of Delaware
Filed July 27, 1959, Ser. No. 829,913
2 Claims. (Cl. 102—49)

This invention relates generally to ballistic missiles and more particularly to an improved booster rocket for providing boosting thrust for a ballistic missile in a controlled manner to enable very accurate ranging of the missile.

Variation in the range of a ballistic missile can generally be accomplished by two methods: First, the launch angle may be varied and second, the speed to which the missile is boosted by the booster rocket can be varied. In the case of short ranges, the first method of varying the launch angle becomes inaccurate since very small angular changes, when the launch angle is less than 30 degrees, for example, result in appreciable changes in the range; that is, the point where the missile will intercept the earth. It is preferable accordingly to maintain the launch angle at a constant value corresponding substantially to the angle of maximum range and vary the range of the missile by varying the boost speed.

To vary the speed at the end of the boost period, the thrust of the booster rocket must be terminated after an accelerometer or other device has computed the desired speed required for the particular range in question. As is well known to those skilled in the art, the thrust of the booster rocket may be readily terminated by simply releasing the combustion pressure in the burning rocket. However, to release this pressure without causing a reaction on the missile itself is very difficult and requires considerable engineering skill.

With the foregoing in mind, it is a primary object of the present invention to provide an improved booster rocket and missile system in which the thrust of the booster rocket can be effectively terminated when the missile has attained a desired speed without causing any reaction on the missile itself to the end that the accuracy of the missile trajectory is not impaired during separation of the booster rocket from the missile.

Other important objects of the invention are to provide a booster rocket for a missile which contributes toward the stability of the booster-missile combination prior to separation and in addition is so designed as to minimize thrust dispersion commonly encountered in booster type rockets.

More general objects of the invention are to provide an improved booster rocket for missiles in which the thrust thereof may be effectively terminated in response to a given flight condition of the missile, and which is simple, reliable in operation, and economical to manufacture.

Briefly these and other objects and advantages of the invention are attained by providing a booster rocket including thrust deflecting means secured to the rocket in a position normally clear of the exhaust gases from the rocket nozzle. A suitable control means is provided for moving the reflecting means into a second position to intercept and deflect at least a portion of the exhaust gases so that the thrust of the booster rocket is deflected thereby permitting separation of the booster rocket from the missile itself. By so deflecting the booster rocket, separation without any reaction on the missile itself can be achieved. Further, the point at which deflection and thus separation is to take place can be very accurately determined so that the missile is traveling at the desired speed for the particular range in question when boost separation occurs.

The booster rocket itself is preferably of spherical shape which not only enables a maximum propellant to be carried with minimum material but in addition shortens the distance between the center of thrust and center of gravity of the booster-missile combination so that dispersion is minimized. Another advantage flowing from the use of a spherical booster is that some degree of aerodynamic stability is afforded the booster-missile combination during the boost period.

A better understanding of the invention as well as certain further features and advantages will be had by referring to the accompanying drawings illustrating a preferred embodiment thereof in which:

FIGURE 1 is a side elevational view partly cut away illustrating the improved booster rocket as used on a ballistic missile prior to separation in accordance with the invention;

FIGURE 2 is another enlarged elevational view of that portion of the booster rocket enclosed in the circular arrow 2 of FIGURE 1; and FIGURE 3 is a rear end elevational view of the booster rocket looking generally in the direction of the arrow 3 of FIGURE 1.

Referring first to FIGURE 1 there is illustrated a typical ballistic missile 10 provided with a booster rocket 11 which may be coupled to the rear end of the missile 10 as by a small cylindrical nose piece 12 projecting into a receiving bore in the missile. The booster rocket 11 also includes thrust deflecting means designated generally by the numeral 13.

The foregoing arrangement is such that during normal boost, the deflecting mechanism 13 is in the position shown so that normal boosting of the missile 10 can take place. When the thrust deflecting mechanism is actuated, the forward components of thrust acting on the missile 10 are effectively terminated to the end that the booster rocket simply separates from the missile 10. This separation can be accomplished either by a reversal of the thrust by the deflecting mechanism or simply as a consequence of the drag of the deflecting mechanism itself together with the booster rocket which drag will cause separation upon diminution of the thrust components in a forward direction.

Referring to FIGURE 2, one means of effecting a deflection of the thrust from the booster rocket 11 is illustrated. As shown, the booster rocket 11 includes a nozzle 14 for directing its thrust along a given axis corresponding to the longitudinal axis of the missile 10 when the device is connected thereto as shown in FIGURE 1. Secured to the end portion of the nozzle 14 is a double yoke mounting 15 pivotably supporting a pair of oppositely extending arms 16 and 17 pivoted to the double yoke structure 15 as at 18 and 19. The oppositely extending end portions of the arms 16 and 17 terminate in deflecting plates which may be in the shape of shells as indicated at 20 and 21. With the foregoing arrangement, the arms and shells can respectively pivot about the points 18 and 19 from the solid to the dotted line position wherein the shells themselves will intercept the exhaust gases from the nozzle 14 and deflect the same laterally. By increasing the curvature of the shells 20 and 21, an actual reversal of the exhaust gases can be effected whereby a backward force on the booster rocket 11 will be exerted to insure a positive separation from the missile 10. By providing identical arms and shells on diametrically opposite sides of the longitudinal thrust axis, symmetrical deflection takes place so that there is no reaction on the missile 10 itself.

As shown in FIGURE 2, a suitable control means is provided in the form of holding members 22 and 23 terminating in hook portions 24 and 25 engaging suitable pegs or pins 26 and 27 respectively secured to the arms 16 and 7. The other end portions of the members 22 and 23 are pivoted at 28 and 29 to frame structures 30 and 31 in turn secured to the booster rocket body 11.

The pivoted end portions of the arms include inwardly direction portions in turn pivoted at 32 and 33 to the plungers of actuating solenoids 34 and 35. The other ends of the solenoids 34 and 35 are respectively pivoted at 36 and 37 to additional frame members 38 and 39 rigidly secured to the nozzle 14. From the foregoing, it will be evident that upon actuation of the solenoids 34 and 35 to retract their plungers respectively, rotation of the holding arms 22 and 23 will take place about the pivot points 28 and 29 to disengage the hooks 24 and 25 from the pins 26 and 27 thereby releasing the arms 16 and 17 and deflecting plates 20 and 21.

To insure positive action of the deflecting plates in moving from the first position shown in FIGURE 2 to the second dotted line position, biasing means are provided tending to urge each of the arms and plates toward this dotted line position. Referring to FIGURE 3, it will be noted that the double yoke mounting 15 includes upper and lower yoke portions 40, 41, and 42, 43 between which the arms 16 and 17 are rotatably mounted. Also included are coiled biasing springs 44 and 45 respectively secured between the arms and the yoke portions in a manner to exert a bias on the arms to urge them toward the dotted line position shown in FIGURE 2.

In operation, the holding members 22 and 23 are in the solid line position shown so that the arms and deflector plates 20 and 21 are held in substantial transverse relationship to the thrust axis of the nozzle 14 clear of the exhaust gases therefrom. The booster rocket and missile 10 shown in FIGURE 1 can then be launched in a conventional manner, the booster rocket providing boost thrust for the missile. When the missile 10 has been boosted to a given speed determined in accordance with the desired range of the missile, a suitable accelerometer or other device responsive to such flight condition generates a signal for actuating the solenoids 34 and 35 in FIGURE 2 to retract the plungers thereof and rotate the holding members 22 and 23 to the dotted line positions. The pins 26 and 27 are thus disengaged and the biasing springs will instantly cause the arms to rotate to the dotted line positions illustrated. As a consequence, the exhaust gases will be intercepted and deflected partially backwardly on themselves to the end that the thrust components in the forward direction are completely terminated and separation of the booster 11 from the missile 10 will take place.

By making the booster rocket body spherical in shape as shown in the drawings, the overall center of gravity of the booster and the missile 10 will be closer to the center of thrust of the booster rocket than would be the case were a conventional cylindrical-type booster employed. As a consequence, thrust dispersion effects are minimized. In addition, the provision of a spherically-shaped body of a diameter greater than the transverse dimension of the missile 10 results in a certain degree of aerodynamic stabilization during flight of the booster and missile together during the boost stage.

From the foregoing description, it will be evident that the present invention has provided a greatly improved booster rocket for use with ballistic missiles. The overall structure is mechanically simple and therefore reliable.

While only one particular means for effecting an interruption or deflection of the exhaust gases of the booster rocket has been illustrated, minor modifications falling clearly within the scope and spirit of the present invention for effecting the same result will occur to those skilled in the art. The booster rocket and missile are therefore not to be thought of as limited to the particular embodiment set forth merely for illustrative purposes.

What is claimed is:

1. A rocket-missile combination comprising a missile; a rocket unit coupled to the missile at the rear end of said missile, said coupling being such that the rocket unit automatically separates from the missile during flight upon a substantial reduction in the forward thrust of the rocket unit, said rocket unit including an exhaust nozzle; exhaust gas deflecting means having a first position in which said deflecting means is disposed out of the flow path of the rocket exhaust gases discharging through said nozzle and having a second position in which said deflecting means is disposed in the flow path of at least a portion of said exhaust gases for substantially reducing the rocket forward thrust; and means operable for causing said deflecting means to move from its said first position to its said second position to effect separation of said rocket unit and missile, said last mentioned means including controllable means responsive to a predetermined flight condition for causing said deflecting means to move to its said second position.

2. A rocket-missile combination as claimed in claim 1 and in which a major portion of the rocket unit body is in the shape of a sphere having a diameter greater than the transverse dimension of the missile.

References Cited by the Examiner

UNITED STATES PATENTS

| 2,753,684 | 7/1956 | Greene | 60—35.6 |
| 2,824,711 | 2/1958 | Porter | 244—14 |
| 2,835,199 | 5/1958 | Stanley | 244—14 |
| 2,995,319 | 8/1961 | Kershner et al. | 244—14 |
| 3,000,597 | 9/1961 | Bell et al. | 244—14 |

OTHER REFERENCES

Aircraft Engineering, vol. 29, No. 343, September 1957, pp. 258–267.

Astronautica Acta, vol. 3, No. 1, 1957, page 70.

BENJAMIN A. BORCHELT, *Primary Examiner.*

CHESTER L. JUSTUS, *Examiner.*